(12) United States Patent
Hughes

(10) Patent No.: US 8,596,929 B2
(45) Date of Patent: Dec. 3, 2013

(54) AVALANCHE CONTROL SYSTEM AND METHOD

(76) Inventor: James R. Hughes, Hilton Head Island, SC (US)

( * ) Notice: Subject to any disclaimer, the term of this patent is extended or adjusted under 35 U.S.C. 154(b) by 136 days.

(21) Appl. No.: 13/176,723

(22) Filed: Jul. 5, 2011

(65) Prior Publication Data

US 2013/0008281 A1  Jan. 10, 2013

(51) Int. Cl.
*E02D 3/00* (2006.01)
(52) U.S. Cl.
USPC ........................................... 405/302.4
(58) Field of Classification Search
USPC ............................. 405/302.4, 303; 52/167.2
See application file for complete search history.

(56) References Cited

U.S. PATENT DOCUMENTS

| | | | | |
|---|---|---|---|---|
| 5,166,909 A | * | 11/1992 | Cole et al. | 367/189 |
| 5,456,325 A | * | 10/1995 | Pantermuehl et al. | 175/6 |
| 6,182,012 B1 | * | 1/2001 | Laurent et al. | 702/6 |
| 6,374,717 B1 | * | 4/2002 | Schippers | 89/7 |
| 7,918,309 B1 | * | 4/2011 | Vierra et al. | 181/161 |
| 2009/0230969 A1 | * | 9/2009 | Hall et al. | 324/343 |
| 2011/0261645 A1 | * | 10/2011 | Sager et al. | 367/14 |

FOREIGN PATENT DOCUMENTS

DE  4021892 A1 * 3/1991

* cited by examiner

*Primary Examiner* — John Kreck
*Assistant Examiner* — Stacy Warren
(74) *Attorney, Agent, or Firm* — Kenneth A. Seaman

(57) ABSTRACT

Avalanche control system and method using one or more chambers in an avalanche-prone area to control the removal of snow or other material which might avalanche. The system includes a plurality of spaced housings made of a solid material like "shock-crete" and an asymmetric flywheel coupled to a motor which is controlled by a signal to warm up and turn on at a desired time to vibrate the housing and cause removal of loose snow or other material and/or the compacting of that material to make avalanching less likely.

7 Claims, 2 Drawing Sheets

AVALANCHE CONTROL SYSTEM AND METHOD

BACKGROUND OF THE INVENTION

Avalanches in skiing areas may be hazardous—they can injure those skiing and those around an avalanche site. Accordingly, it has been desirable to remove snow in a controlled way and/or at a predetermined time to avoid such injuries to avoid undesirable avalanches.

It has long been known that vibration can destabilize snow in avalanche-prone regions. Helicopters, snowmobilers, trekkers and skiers can start such an avalanche (either deliberately as planned or accidentally) and some of these methods have been used in some ways for avalanche control in the past. Conventionally, unstable (avalanche-prone) areas have also been cleared with a concussive wave. Artillery shells and dynamite have been the main tools for creating a convulsive wave in commercial ski areas, but recently a system using fuel-air mixture with propane from a fixed targeted unit has been proposed to clear an area of snow which might avalanche.

Some known approaches to controlling avalanches are costly or dangerous and others are complicated in that they involve components which are prone to fail or unreliable. Some of the components are difficult to maintain in the weather conditions of an avalanche area, namely cold and wet during the winter, with warmer temperatures at other times of the year. Other systems rely on human actions and therefore put humans in the region of an intended avalanche, which can be dangerous.

The use of some materials in creating an avalanche have the undesirable effect of releasing harmful chemicals in the area. Those chemicals include silver compounds and benzene. Such materials are carried by the snow into the water supply of the area as the snow melts and create health concerns in the areas and downstream from them. Such chemicals can be harmful to humans, either from drinking water with the chemicals or by eating fish that have been in such water. Accordingly, it is desirable to avoid using chemicals, including tnt, to induce avalanches.

However, these systems have undesirable limitations and aspects. The present invention addresses some of these undesirable limitations and aspects to provide an improved system and method for reducing the possibility of undesirable and untimely avalanches.

SUMMARY OF THE INVENTION

The present invention provides a system and method for removing some snow which otherwise might avalanche at an untimely time and place.

The present invention uses an arrangement of avalanche control devices set in spaced locations throughout an avalanche-prone area. These devices include a motor driving an asymmetric flywheel causing vibration inside a concrete housing. The device includes, in its preferred embodiment, optional elements including one or more sensors, a power supply, a controller, an rf antenna for communication and a solar array for recharging the power supply to provide a self-contained unit which is capable of operational control from afar and even timed or condition-sensing operation.

Applicant teaches in this patent application that a normally solid material such as powdered snow will become viscous (liquid-like) at a certain frequency and intensity of vibration. The present invention seeks to use this feature to get snow moving by vibrating it and turning it from a solid and unmoving mass into a material which will flow in response to forces and move, particularly in response to gravity, to a position of lower potential energy and where the snow is less likely to create an uncontrolled and hazardous avalanche. When the snow is destabilized sufficiently, an avalanche of snow is induced. Conversely, if the vibration of the snow is not sufficient to destabilize the snow into an avalanche, such vibration may cause the snow to become more packed and create a more stable arrangement of packed snow which is less likely to avalanche when skiers pass nearby and cause forces on the snowpack.

It is desirable that an avalanche control unit be inexpensive, easy and simple to install and maintain, yet be effective at initiating an avalanche as desired, such as on command or in response to sensing of a desired time and/or external conditions.

The present invention overcomes the disadvantages and limitations of the prior art systems while providing a simple, yet effective, way of controlling the snow which might otherwise avalanche at an undesirable time. The present invention provides a simple device and system which should have an extended life while being easy to maintain.

Other objects and advantages of the present invention will be apparent to those of ordinary skill in the art in view of the following detailed description of the preferred embodiment taken in conjunction with the accompanying drawings.

DETAILED DESCRIPTION OF THE PREFERRED EMBODIMENT

Figure 1:
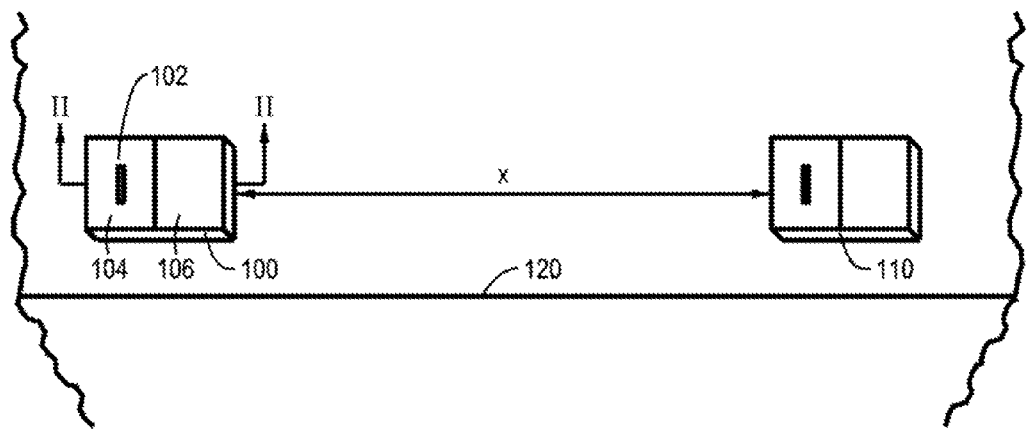
FIG. 1 is a top view of an area which is considered avalanche-prone, showing two avalanche control devices mounted at a spaced interval near an edge or drop-off.

FIG. 1 illustrates an aerial perspective view of a portion of an avalanche-prone area, perhaps in the area of a skiing, with two assemblies of the present invention. A first assembly 100 and a second assembly 110 are each mounted into a cavity in the ground at separated locations, shown separated by x distance. While the distance x may vary from one location to the next and may depend on the terrain and the material of the adjacent terrain, typically it is on the order of 50 feet.

The first assembly 100 has a handle 102 mounted to one portion of a cover 104 which mates with a second cover portion 106. These cover portions 104 and 106 provide a removable cover which can be opened for inserting and maintaining equipment within the chamber, but closed to provide some protection from external elements such as snow and water.

The first assembly 100 is typically approximately a rectangular solid approximately 2 to 3 cubic meters in capacity and is mounted within a slightly larger aperture in the terrain. Since the terrain is often bedrock, this is accomplished by preparing a slightly larger aperture in the terrain by drilling or blasting the bedrock to provide an aperture of a suitable size and shape to receive the assembly.

These assemblies are typically mounted in an area which is prone to snow accumulation and prone to avalanche. The environment of FIG. 1 is shown to have an edge or vertical drop 120, although this is merely representative of such areas and not a requirement.

Figure 2:
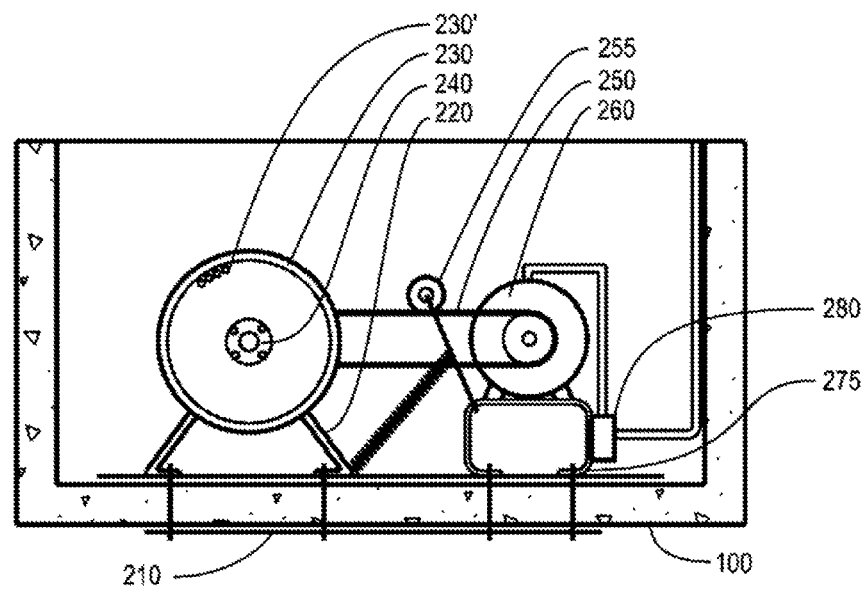
FIG. 2 is a cross-sectional side view of one of the avalanche control devices of FIG. 1, taken along the line I-I of FIG. 1, looking in the direction of the arrows.

FIG. 2 illustrates a cut-away side view of the first assembly 100 of the present invention. The external walls of the assembly are typically made of a material which is known commercially as "Shock-Crete™" concrete, a special form of concrete which is reinforced and more resistant to vibration and other forces than plain concrete. While the size of the enclosure and the thickness of the concrete are somewhat matters of design choice, typically the enclosure would be on the order of 2 feet long by 1 foot wide by 1 foot high and the walls of the assembly would be on the order of 10 cm (or 4 inches) thick.

Associated with the assembly 100 is a steel plate 210 which mounts legs 220 to a flywheel 230. The flywheel 230 is mounted to the legs 220 by bearings 240 and is driven by a drive belt 250. The drive belt 250 is driven by motor 260 which is mounted to the assembly 100 by mounts 270. If needed, the drive belt 250 is kept taut by a weighted tensor or tensioning device 255. Since the motor 260 may generate heat and be mounted in an area of relative coldness, the temperature of the enclosure may vary significantly over time (depending on whether the motor has been running and the outside temperature) and require some tensioning of the drive belt 250 which is made from a resilient rubber-like material in the preferred embodiment and may be a "v-belt" similar to that used for transmitting motion and energy in a gasoline engine.

The flywheel 230 is asymmetric in that one portion is heavier than the corresponding opposite side. One simple way to create this heavier portion is to remove small portions or circles 230' from one side. This lighter side causes the flywheel 230 to vibrate as it rotates, and the vibration is transmitted through the legs 220 and the housing 100 to the earth surrounding the assembly. Although the size and rotational rate of the flywheel 230 are somewhat a matter of design choice, the typical choices are approximately 50 kg for the flywheel and a rotation at approximately 300 rpm (plus or minus about 100 rpm). The flywheel is mounted so the axle and the bearings 240 are accessible and can be easily replaced or serviced. The legs 220 are made of non-corroding materials such as stainless steel or aluminum to provide for longer life, if desired. The asymmetric flywheel 230 is sufficient to cause non-destructive vibration of the assembly—that it, not enough to damage the assembly, the mounting or the housing.

The motor 260 is a 24 volt direct current motor. This motor 260 is mounted to the housing 100 using vibration dampening mounts 275 such as rubber members to increase the life of the motor 260 by reducing its wear (recall that the housing 100 is deliberately vibrating as a result of the asymmetrical flywheel 230; vibration is not good for a motor's life and the rubber mounts are an attempt to isolate the motor 260 somewhat from the vibration.)

The rotation of an asymmetric flywheel 230 at about 300 Hertz or rpm is meant to impart the equivalent of approximately a grade 6 earthquake at the housing and its mounting to the ground. The force of such an earthquake-like tremor imparts movement to the snow in the vicinity, with the intent of creating a controlled avalanche. Of course, since such an impact is not good on the motor, it is desirable that the motor be isolated to the extent possible from the impact. Accordingly, the motor 260 is mounted through shock-absorbing mounts such as rubber mounts to reduce, if not eliminate, harmful vibrations on the motor 260.

Figure 3:
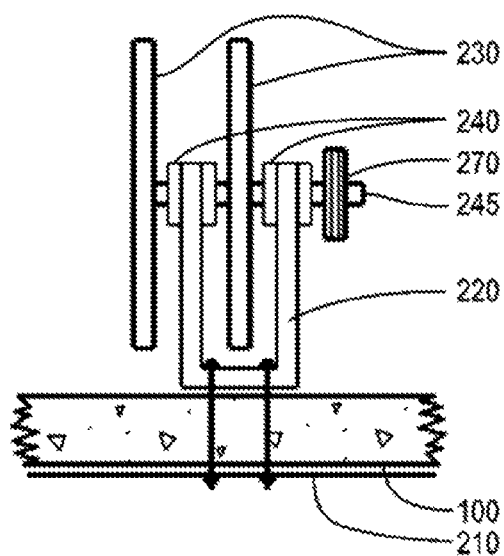
FIG. 3 is a partial, cross-sectional end view of the avalanche control device of FIGS. 1 and 2.

FIG. 3 illustrates the end view of the flywheels 230 and bearings 240 carried on an axle 245. The axle 245 also carries a sheave 270 for receiving the drive belt (not shown in this view) and imparting rotational motion to the flywheels 230. Legs 220 mount the assembly to the metal plate 210 through the housing 100 of Shock-Crete concrete.

Figure 4:
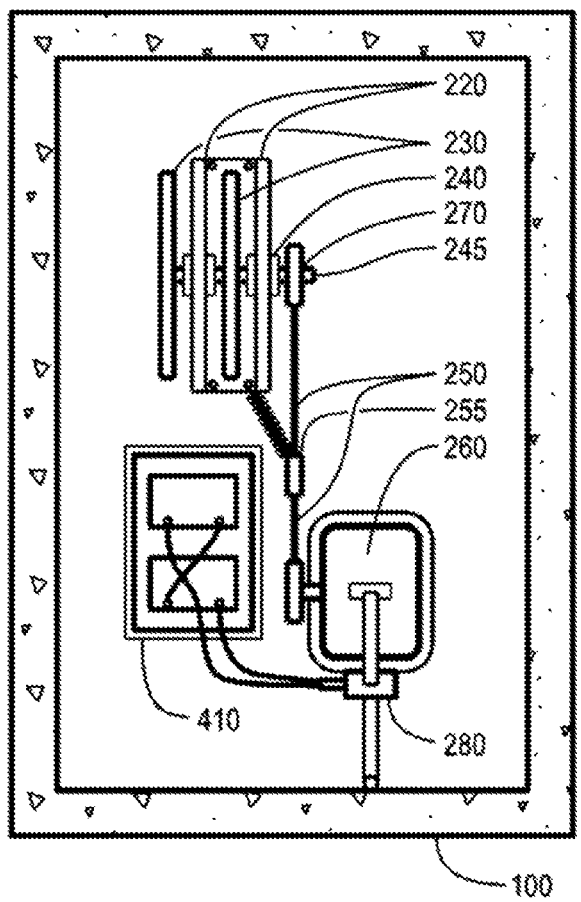
FIG. 4 is a cross-sectional top view of the avalanche control system of FIGS. 1-3.

FIG. 4 shows a top view of one configuration of the present invention. The legs 220 are shown with the flywheels 230 and the bearings 240 mounted to the axle 245. The sheave 270 carries the drive belt 250 which is tensioned by tensioning device 255. Motor 260 drives the drive belt 250 and is controlled by cable 280. Two 12-volt batteries are mounted in series in a battery unit (or battery box) 410. The cable may be connected to external controls to initiate the avalanche control system of the present invention and may include an RF antenna (not shown) and/or auxiliary power as well. Further, the system may have sensors for temperature and moisture to insure that conditions are appropriate for starting the avalanche control system (the unit is warm enough and not flooded, for example) and a time if desired to warm up the motor 260 before powering the motor.

This system is simple and inexpensive to maintain. The belt 250 and the bearings 240 are replaced annually with the batteries checked and a cleaning of the solar elements. Every other year the batteries are replaced and the solar elements and motor 260 are checked and replaced, if necessary.

Not explicitly shown in these figures are drainage apertures in the assembly and one or more port(s) through which signals and power may be transmitted to the assembly from an antenna and a power supply, respectively. Regardless how tight the cover fits and how tightly the assembly may be fashioned, moisture may enter into the assembly 100, and it is desirable to provide drain apertures on the lowest portion to allow the water to escape rather than to accumulate within the assembly. The signals to the assembly 100 may be from an external command to initiate the vibration (perhaps after a period of warming up, if appropriate) or the signals may be from external sensors which indicate that there is sufficient snow to have the vibration of the assembly start. That is, the present assembly may be operated by an operator deciding that it is appropriate to start vibration of the ground for avalanche control or from an automatic sensing of conditions ripe for an avalanche and initiating avalanche control vibration.

The present embodiment also includes a battery unit and two types of sensors (not shown in the accompanying drawings). The first set of sensors is a sensor of ground vibration which indicates that the assembly is operating as it is supposed to operate, to vibrate the surrounding ground. Should the flywheel become disconnected from the concrete housing 100, then the vibration of the flywheel would not impart the necessary vibration to the ground and that condition would require correction. The other set of sensors provides a thermal indication and functions to warm the battery unit to −15 degrees Celsius before operating. This can be accomplished by heating the battery unit for approximately one hour before the operation of the battery unit to power the motor. The battery unit comprises two batteries, each 12 volt deep cycle, high efficiency and wired in series to provide increased voltage. The battery unit is mounted in an insulating compartment and has a heating circuit. A solar array of photovoltaic cells generates between 40 and 100 watts in the sunlight and provides recharging through a regulator which prevents the overcharging of the batteries. A controller receives a signal to start a cycle through the rf antenna (or through a pre-programmed signal such as a timer) and throws a relay to start the pre-heating of the batteries (if required) then to start the motor 250 to drive the asymmetric flywheel to produce the vibration forces. A sensor determines if the unit is operating properly (with the correct level of vibration of the surrounding ground) and to send an alarm if it is not operating within defined limits.

The present system also envisions that control signals will be transmitted to the device and there would be feedback to the operator from a detector (not shown) in the device, indicating that the device did operate. Also, the system could operate autonomously from a timer, if desired.

Of course, many modifications to the best mode described above may be effected without departing from the spirit of my invention. Further, some of the features disclosed may be useful without the corresponding use of other features. For example, the method of powering the motor has been disclosed to be from batteries driven by solar cells, while it is known that commercial electricity or even generators could be used to advantage in some instances. Vibrations could be generated through the use of other systems than an asymmetric flywheel, if desired. Additionally, the method of signaling the motors to start operating has been disclosed as from an operator signal through an rf antenna, when a hardwired line or even a timer (or other sensor) could be employed in some instances. Accordingly, the foregoing description of the preferred embodiment should be considered as merely illustrative of the principles of the present invention and not in limitation thereof. The scope of the present invention is to be determined solely by the claims which follow.

Having thus described the invention, what is claimed is:

1. A system for inducing a planned avalanche of snow comprising: a motor driving an asymmetrical flywheel for producing vibration in a housing coupled to the flywheel, said housing mounted within an aperture in the ground near the snow where an avalanche is desired and secured to the ground to provide a vibration of the ground when the motor drives the asymmetrical flywheel to induce the planned avalanche of snow when the motor drives the asymmetrical flywheel to produce vibration of the ground.

2. A system including the elements of claim 1 wherein the housing is formed from a concrete material.

3. A system including the elements of claim 1 wherein the motor is mounted to the housing though a vibration-absorbing structure.

4. A system including the elements of claim 1 wherein the system includes a plurality of spaced housings, each housing including a motor and an asymmetrical flywheel for producing vibration to trigger a planned avalanche of snow.

5. A method of inducing a planned avalanche of snow comprising the steps of: mounting a source of vibration within a solid housing which is mounted within an aperture in the ground in an area of snow where it is desired to induce an avalanche, wherein the source of vibration includes an asymmetric flywheel and a motor which is controlled to drive the asymmetric flywheel to produce vibration of the ground; on command, energizing the source of vibration to vibrate the solid housing to control the removal of snow, whereby the vibration of the solid housing causes a vibration of the ground which causes snow to be shed; and ceasing the vibration after a period of time.

6. A method including the steps of claim 5 wherein the asymmetric flywheel creates an impact comparable to a grade 6 earthquake in the vicinity of the housing.

7. A method including the steps of claim 5 wherein the motor is mounted to the housing through a vibration-absorbing structure.

* * * * *